United States Patent
Freund et al.

(10) Patent No.: US 6,808,322 B2
(45) Date of Patent: Oct. 26, 2004

(54) DEVICES AND METHOD OF MOUNTING

(75) Inventors: Joseph Michael Freund, Fogelsville, PA (US); John Michael Geary, Longswamp Township, PA (US)

(73) Assignee: TriQuint Technology Holding Co., Hillsboro, OR (US)

( * ) Notice: Subject to any disclaimer, the term of this patent is extended or adjusted under 35 U.S.C. 154(b) by 156 days.

(21) Appl. No.: 10/253,268

(22) Filed: Sep. 24, 2002

(65) Prior Publication Data

US 2004/0058475 A1 Mar. 25, 2004

(51) Int. Cl.[7] .............................. G02B 6/36; G02B 6/44; H01L 21/44
(52) U.S. Cl. .................... 385/92; 385/114; 438/113
(58) Field of Search .............................. 385/49, 88, 92, 385/14, 15, 39, 32, 83, 41, 130; 372/50; 216/24; 438/31, 118, 65, 27, 26, 42, 51, 55, 64, 22, 113; 156/60

(56) References Cited

U.S. PATENT DOCUMENTS

| | | | | |
|---|---|---|---|---|
| 5,454,055 A | * | 9/1995 | Kragl et al. | 385/14 |
| 5,666,446 A | * | 9/1997 | Kragl | 385/14 |
| 5,812,726 A | * | 9/1998 | Jinnai et al. | 385/137 |
| 5,867,619 A | * | 2/1999 | Jarek et al. | 385/49 |
| 6,160,947 A | * | 12/2000 | Osugi et al. | 385/137 |

* cited by examiner

Primary Examiner—John R. Lee
Assistant Examiner—James P. Hughes
(74) Attorney, Agent, or Firm—Lester H. Birnbaum

(57) ABSTRACT

A device, such as an optoelectronic device, including a submount and a cover, and a method of manufacture of such a device. The submount includes a substrate with a groove formed in the substrate. The substrate further includes at least one cavity formed in the substrate displaced from but in sufficiently close proximity to the groove so that a controlled amount of liquid adhesive, such as epoxy, in the cavity wicks into the groove when the cover is placed over the cavity and groove.

20 Claims, 5 Drawing Sheets

DEVICES AND METHOD OF MOUNTING

FIELD OF THE INVENTION

The present invention relates generally to devices requiring an adhesive in a groove, and, more particularly, to a submount and method of mounting optoelectronics devices.

BACKGROUND OF THE INVENTION

Optical systems have become increasingly important in modern telecommunications primarily due to their huge information handling capacity. Such systems include lasers, photodetectors, modulators, and other components. The components are usually mounted on a submount. The submount typically comprises a silicon substrate with bonding pads for the components formed on a major surface, and V-shaped grooves etched into the substrate to accommodate optical fibers coupled to the components. The fiber may be secured in the groove by epoxy.

Problems often arise when filling the V-grooves with epoxy. For example, the groove may include a fulcrum portion for fiber alignment, in which case it is difficult for the epoxy to flow and fill the groove. (See, eg, U.S. patent application of Freund and Geary case 73-21, filed Aug. 29, 2002, and assigned to the present assignee.) On the other hand, the grooves may include a well portion at the end nearest the component which desirably should be free from epoxy, and, consequently, an excess amount of epoxy would be detrimental.

For these and other reasons, it is desirable to provide an optoelectronic device with a submount and method which results in a precise amount of epoxy or other material in the V-grooves of the submount.

SUMMARY OF THE INVENTION

The present invention, in accordance with one aspect, is a device including a submount and a cover. The submount includes a substrate with a groove formed in the substrate. The substrate further includes at least one cavity formed in the substrate displaced from, but in sufficiently close proximity to the groove so that a controlled amount of adhesive in the cavity wicks into the groove when the cover is placed over the cavity and groove.

In accordance with a further aspect, the invention is a method of fabricating a device comprising providing a substrate including a groove, and at least one cavity formed in the substrate displaced from, but in close proximity to the groove. A controlled amount of adhesive is deposited in the cavity. A cover is then placed over at least a portion of the groove and cavity so as to wick at least a portion of the adhesive from the cavity into the groove.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice in the semiconductor industry, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
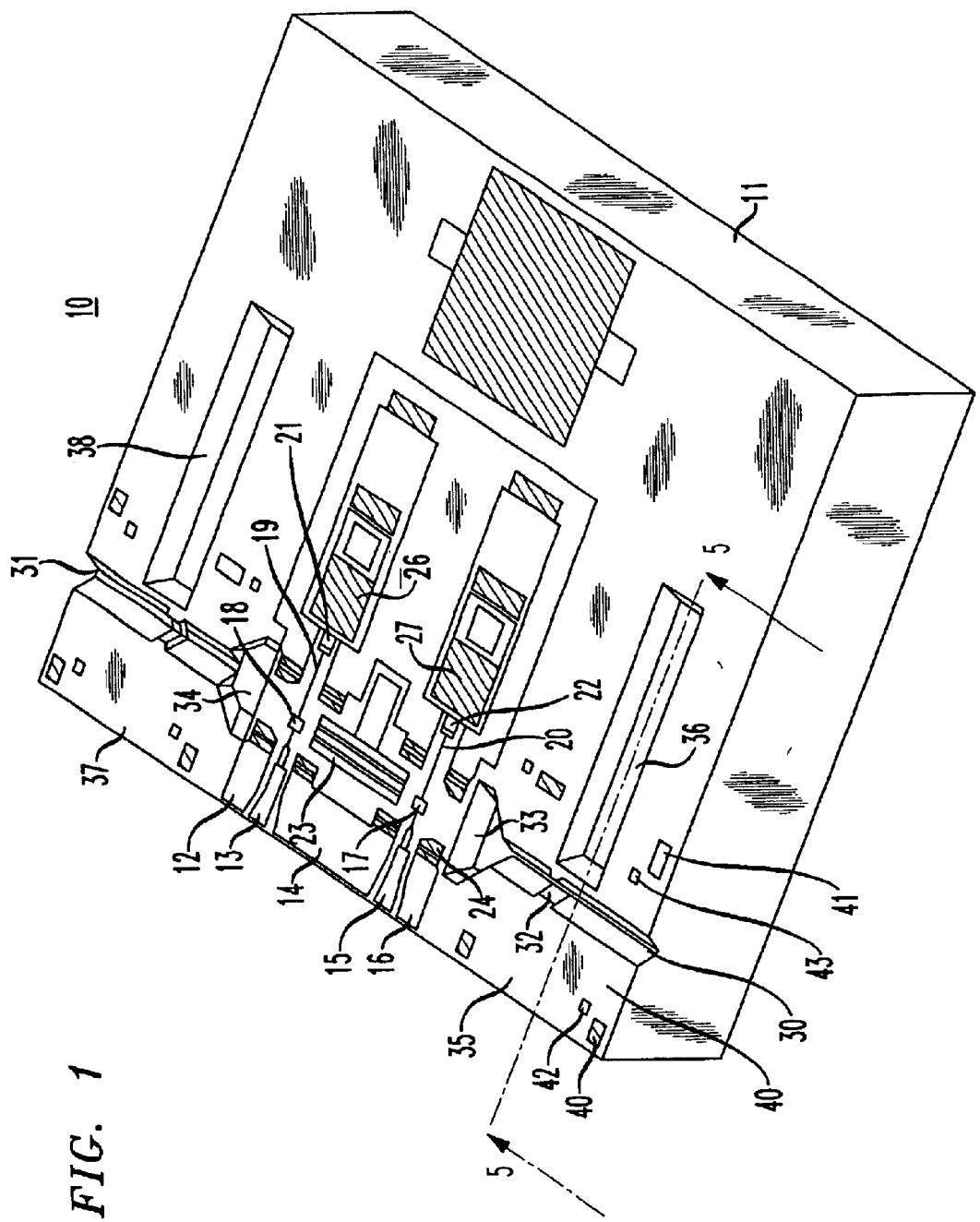
FIG. 1 is a perspective view of a submount which may be utilized in accordance with an embodiment of the invention.

Referring now to the drawing, wherein like reference numerals refer to like elements throughout, FIG. 1 is a perspective view of a submount, 10, which may be utilized according to an embodiment of the invention. The submount includes a substrate, 11, which is typically silicon. Various electrical and optical components are mounted on a major surface of the substrate. In this example, a coplanar waveguide formed by metallizations 12–16, provide an input electrical signal. In particular, metallizations 12, 14, and 16 are grounded, while metallizations 13 and 14 conduct the input signal. The signals in this example are propagated at high frequencies, typically in the range 10 to 40 GHz. Metallizations are typically gold. The signal conductors, 13 and 15 are coupled to respective contact pads, 18 and 17, which will be electrically coupled to electrodes of a modulator (FIG. 2) when the modulator is mounted to the submount.

Also coupled to the contact pads, 18 and 17, are conductors, 19 and 20, respectively, which are, in turn, electrically coupled to load resistors, 21, and 22. Contact pad, 23, is also provided on the substrate for making electrical contact to the amplifier electrode of the modulator (FIG. 2) which will be mounted to the submount. Additional grounded bonding pads, 26 and 27, are further provided on the substrate for making electrical contact to respective high frequency capacitors (not shown).

Figure 4:
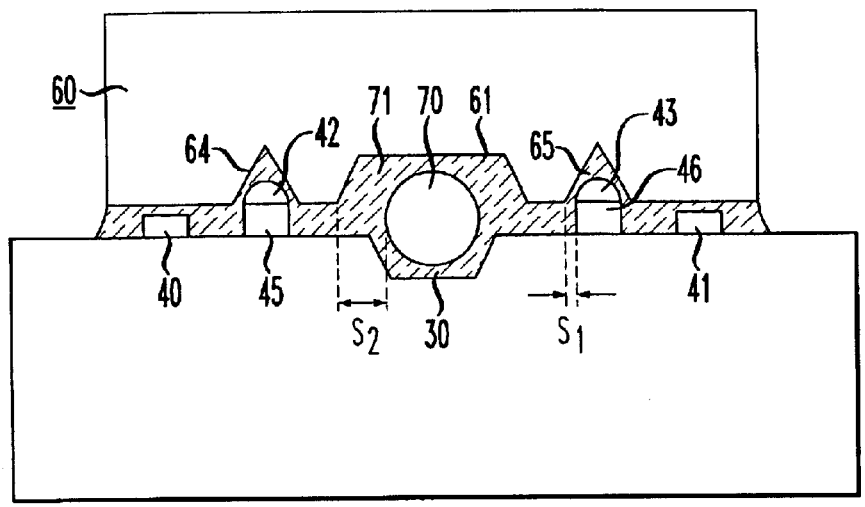
FIG. 4 is an end view of the submount of FIG. 1 with an optical fiber and cover mounted to the submount in accordance with an embodiment of the invention.

V-shaped grooves, 30 and 31, are etched into the surface of the substrate in order to accommodate input and output optical fibers, one of which is illustrated in FIG. 4. It will be appreciated that in the context of this application, a "V-shaped groove" is considered to be any indentation with sloping sidewalls for mounting a fiber, and can have a flat bottom surface or be u-shaped. In this particular example, the grooves also include a fulcrum portion, eg, 32, which permits alignment of the fibers. (See U.S. patent application of Freund et al cited previously.) At the end of each groove, 30 and 31, are wells, 33 and 34, respectively, which are also etched into the surface of the substrate but with much wider dimensions than the grooves. In the final device, the ends of the optical fibers will be positioned over the wells and aligned with the modulator (FIG. 2) according to known techniques.

Cavities, 36 and 38, are etched in the substrate displaced from, but in close proximity to, corresponding grooves, 30 and 31. It may also be advantageous to form a pair of cavities, one on either side of each grove. The submount further includes solder pads, eg, 42 and 43, positioned on the substrate so as to provide alignment of the cover, 60 of FIG. 3, with respect to the grooves, 30 and 31. Spacer pads, eg, 40 and 41, typically made of gold are also formed on the substrate in order to provide proper vertical spacing for the cover.

Figure 2:
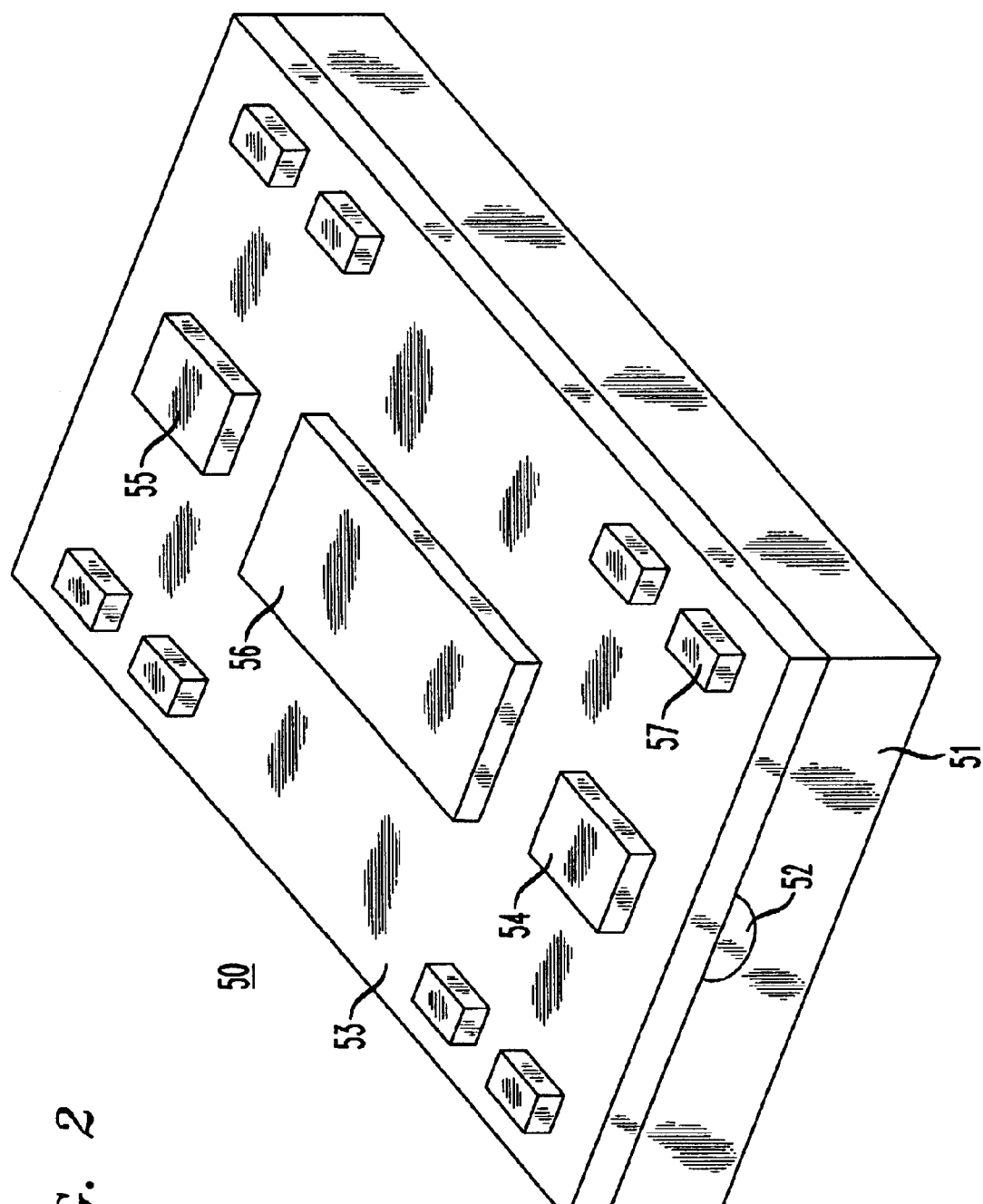
FIG. 2 is a perspective view of an optoelectronic device which may be utilized with the substrate of FIG. 1.

FIG. 2 illustrates a modulator, 50, which will be mounted to the submount, 10. (Actually, FIG. 2 depicts two electrically isolated modulators integrated in a single device for providing carving and coding of the light signal, but for the sake of exposition is considered to be a single modulator.) In this example, the modulator included a substrate, 51, comprising Indium Phosphide, with a standard optical waveguide, 52, formed in the substrate. An insulating layer, 53, was formed over the major surface of the substrate. Formed on the layer, 53, were electrodes, 54 and 55, for providing an electrical field to the waveguide which alters the loss experienced by light propagating through the waveguide, 52. Ground electrodes, eg, 57, were formed around the periphery of the device. An optical amplifier was also formed in the modulator, with an electrode contacting the amplifier illustrated as 56. It will be appreciated that the modulator shown is merely one example of a device which may be bonded to the submount of FIG. 1.

The modulator is mounted to the submount by applying solder (illustrated by cross-hatched areas) to the various bonding pads, and aligning the device so that the electrodes 54 and 55 make contact with the pads, 17 and 18, respectively, the amplifier contact electrode, 56, makes contact with the contact pad, 23, and the ground electrodes, eg, 57, make contact with respective ground pads, eg, 24, on the substrate, 11.

Figure 3:
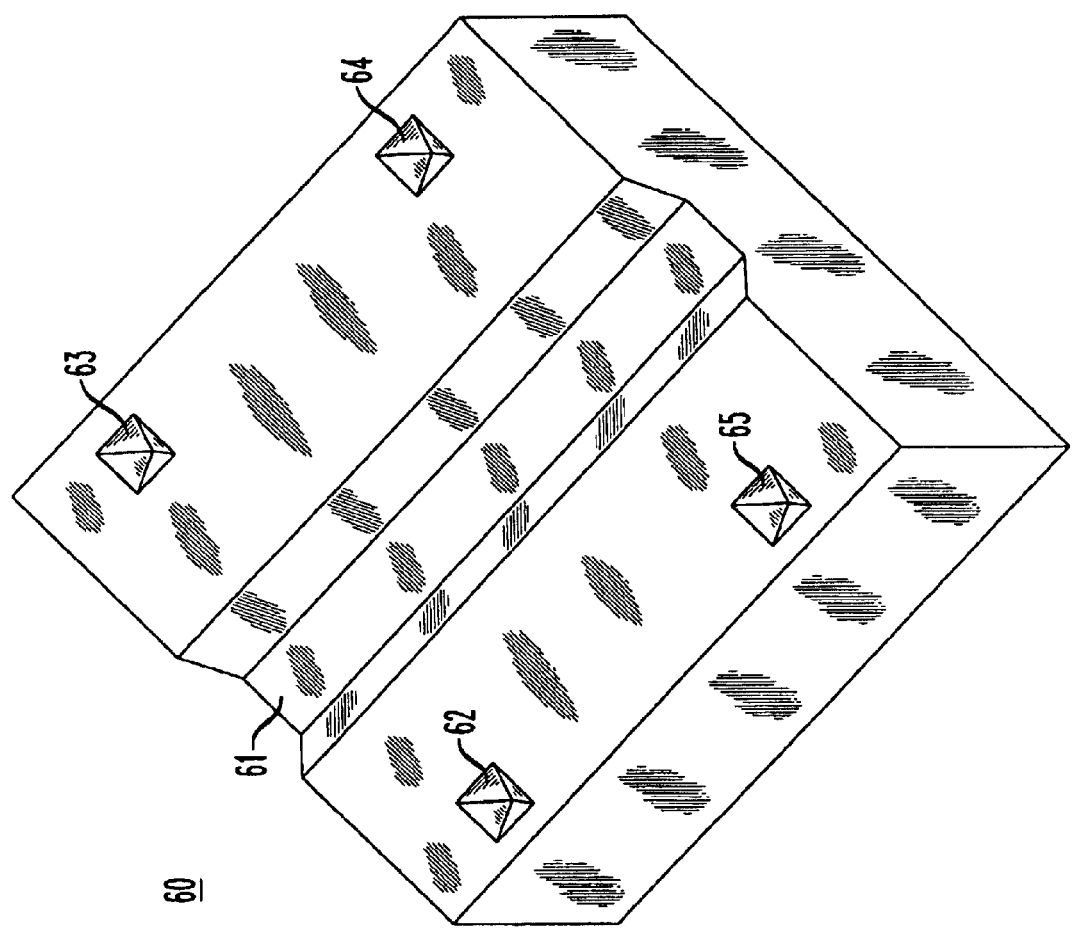
FIG. 3 is a perspective view of a cover which may be utilized with the submount of FIG. 1.

FIG. 3 illustrates a cover, 60, which will be mounted on the submount, 10. The cover, which is typically made of silicon, includes a V-groove, 61, which matches the V-grooves, 30 and 31, of the submount, 10. The cover also includes cavities, 62–65, around the periphery which match solder pads, eg, 42 and 43 of FIG. 1, on the submount. These cavities and pads can provide alignment for the cover on the submount.

FIG. 4 illustrates in an end view the resulting device when an optical fiber, 70, is mounted in one of the V-grooves, 30, and the cover, 60, is mounted thereover. (It will be appreciated that in this embodiment, two separate covers would be utilized, one for the fiber mounted in groove 30, and another for the fiber mounted in groove 31. Each cover would extend approximately from an end surface of the substrate, 11, to an area over a corresponding well, 33 or 34). A liquid adhesive, in this case epoxy, 71, fills essentially all of the space of the combined V-grooves, 30 and 61, not occupied by the fiber, 70. The vertical distance of the cover from the surface of the substrate is determined by the spacer pads, eg, 40 and 41. The cover is aligned over the groove, 30, by the solder pads, eg, 42 and 43, which mate with the cavities, 64 and 65, in the cover. The solder pads, 42 and 43, are formed on pads, 45 and 46, and assume the curved shape shown when the modulator is attached to the submount because the solder is melted at this stage. Desirably, the dimensions of the groove 61 are chosen so that the distance, $S_2$, of the edge of the groove from the fiber, 70, is larger than the distance, $S_1$, of the edge of the cavities, 64 and 65 from the solder pads, 42 and 43. This ensures that the cover will not move significantly while the epoxy is flowing.

Figure 5:
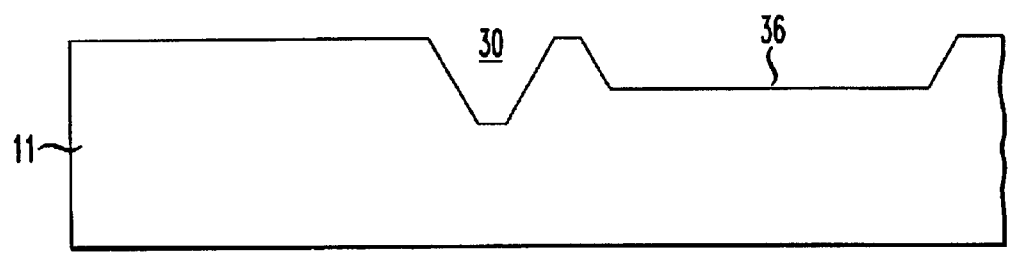
FIGS. 5–7 are cross sectional views of a device during various stages of manufacture along line 5—5 of FIG. 1 in accordance with an embodiment of the invention.
Figure 6:
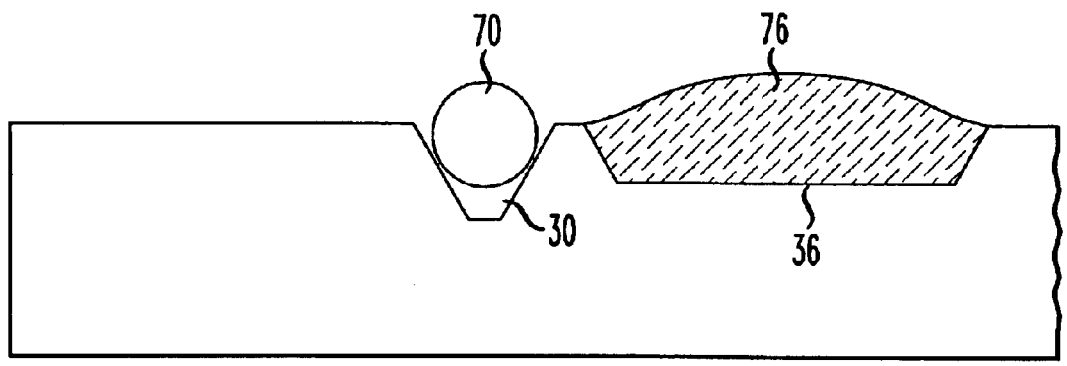
Figure 7:
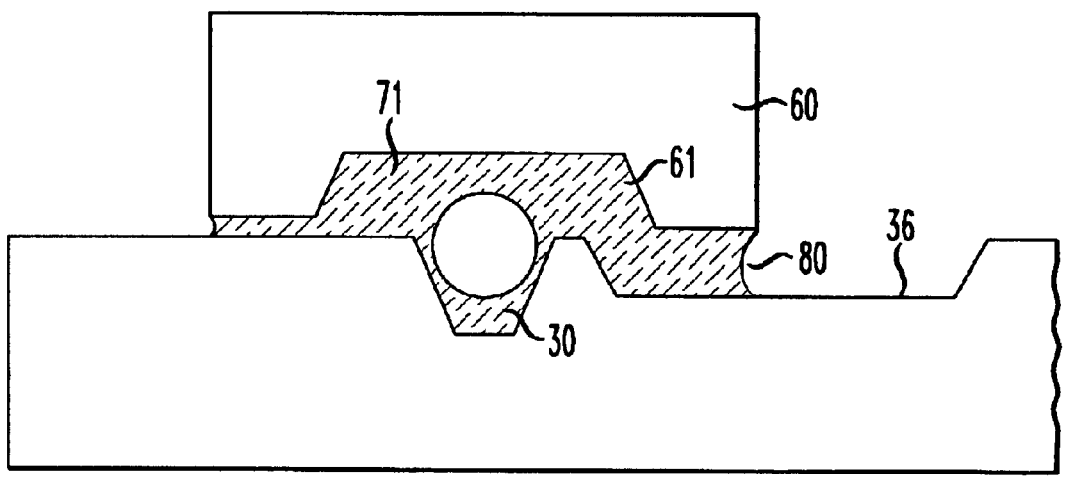

FIGS. 5–7 illustrate in cross sectional views along line 5—5 of FIG. 1, the method aspects of the invention in accordance with one embodiment. FIG. 5 illustrates the substrate, 11, with the cavity, 36, displaced from, but in close proximity to, its corresponding groove, 30. The grooves and cavities may be formed in a single etching step by standard photolithographic techniques. The volume of the cavity, 36, is made to hold a controlled amount of epoxy to be applied to the groove, 30, after mounting of the fiber. For example, a length of 1375 microns, width of 300 microns, and depth of 100 microns is used in this particular embodiment for the cavity where the groove, 30, has a length of 1035 microns, width of 178 microns, and depth of 100 microns.

As illustrated in FIG. 6, a controlled amount of epoxy, 76, is deposited in the cavity, 36. Deposition may be by syringe. Preferably, the epoxy completely fills the cavity and extends above the surface of the substrate as shown. In this example, the epoxy, 76, is a commercially available epoxy sole by Epotek under the product designation "301". In general, the invention can be used with any liquid adhesive which is not thixotropic. Preferably, the adhesive is thermally cured and has a viscosity in the range 100 to 100,000 cps. The optical fiber, 70, is also inserted in the groove, 30.

As illustrated in FIG. 7, the cover, 60, is mounted over the groove, 30, in the substrate and the fiber, 70, within it. Referring back to FIG. 4, it will be noted that the cover is aligned using the solder pads, eg, 42 and 43, on the substrate and the cavities, eg, 64 and 65, in the cover. The spacers, eg, 40 and 41, on the substrate provide the desired gap between the cover and substrate.

Again referring to FIG. 7, the placement of the cover, 60, over the cavity, 36, and in contact with the epoxy, 76, therein, causes the epoxy to wick out of the cavity and into the space not occupied by the fiber, 70, in the combined grooves, 30 and 61. Desirably, only the portion of the epoxy, 76, covered by the cover will remain in the cavity as shown since the volume of the epoxy not covered by the cover was calculated to be approximately equal to the combined volume of the grooves 61 and 30 and the space between the substrate and cover minus the volume of the fiber, 70. The surface tension created in the epoxy also serves to prevent over-filling of the space around the fiber since a concave meniscus, 80, will form at the edge of the cover to pull back on the epoxy if there is a tendency for the epoxy under the cover to be wicked. It may be desirable in certain circumstances to wick out the entire amount of epoxy, 76, from the cavity, 36, by providing a larger amount of epoxy in the cavity.

In order to provide wicking in this example, the cavity, 36, was spaced a distance of approximately 35 microns from the edge of the groove, 30. In most cases, the cavity would be placed a distance from the groove which is in the range 10 to 50 microns.

Although the invention has been described with reference to exemplary embodiments, it is not limited to those embodiments. Rather, the appended claims should be construed to include other variants and embodiments of the invention which may be made by those skilled in the art without departing from the true spirit and scope of the present invention. For example, although the invention has been described with reference to an optoelectronic device, it may be useful wherever it is desired to provide a controlled amount of liquid adhesive in a groove when a cover is mounted over a substrate.

What is claimed:

1. An optoelectronic device comprising a submount and a cover, the submount comprising:
   a substrate with a groove formed in the substrate; and
   at least one cavity formed in the substrate displaced from but in sufficiently close proximity to the groove so that a controlled amount of liquid adhesive in the cavity wicks into the groove when the cover is placed over the cavity and groove.

2. The device according to claim 1 wherein the groove is a V-shaped groove.

3. The device according to claim 2 further comprising an optical component mounted to the submount.

4. The device according to claim 2 further comprising a well portion at one end of the groove, the well portion having a width which is greater than the groove.

5. The device according to claim 4 wherein the dimensions of the cavity are chosen so that the adhesive wicks into the groove, but not the well.

6. The device according to claim 2 wherein the groove includes a fulcrum portion.

7. The device according to claim 2 further comprising an optical fiber mounted in the groove.

8. The device according to claim 1 further comprising solder pads in close proximity to the groove for aligning the cover over the groove.

9. The device according to claim 1 wherein the cavity is placed a distance from an edge of the groove which is in the range 10 to 50 microns.

10. The device according to claim 1 wherein the cover also includes a groove, the grooves of the cover and submount forming a volume in which the adhesive is contained.

11. The device according to claim 1 wherein the adhesive is an epoxy.

12. A method of fabricating an optoelectronic device comprising:

providing a submount including a substrate having a groove which can accommodate an optical fiber, and at least one cavity formed in the substrate displaced from but in close proximity to the groove;

depositing a controlled amount of liquid adhesive in the cavity; and placing a cover over at least a portion of the groove and cavity so as to wick at least a portion of the adhesive from the cavity into the groove.

13. The method according to claim 12 wherein the adhesive is deposited by a syringe.

14. The method according to claim 12 wherein the groove and cavity are formed by etching in the substrate at the same time.

15. The method according to claim 12 wherein the adhesive is deposited in the cavity so as to extend above the surface of the substrate.

16. The method according to claim 12 wherein the wicked portion of the adhesive is the portion not covered by the cover.

17. The method according to claim 12 wherein the groove is a V-groove, and further comprising mounting an optical fiber in the groove prior to placing the cover.

18. The method according to claim 17 wherein the cover also includes a V-groove which is placed over the V-groove of the substrate and forming a space therewith, wherein the adhesive fills essentially the entire space formed by the two grooves not occupied by the fiber.

19. The method according to claim 18 wherein the substrate further comprises a well portion at one end of the V-groove, the well portion having a width which is greater than the V-groove, and wherein the controlled amount of adhesive is such that the adhesive does not extend into the well when the cover is placed over the V-groove.

20. The method according to claim 12 wherein the adhesive is an epoxy.

* * * * *